United States Patent [19]

Friederich

[11] Patent Number: 4,968,210
[45] Date of Patent: Nov. 6, 1990

[54] VEHICLE CARRIER

[76] Inventor: James F. Friederich, 515 S. High St., Belleville, Ill. 62220

[21] Appl. No.: 424,657

[22] Filed: Oct. 20, 1989

[51] Int. Cl.⁵ .............................................. B60P 1/18
[52] U.S. Cl. .................................. 414/485; 414/430; 414/494; 280/402
[58] Field of Search ............... 414/426, 430, 480, 482, 414/484, 485, 494, 537, 538; 280/402, 414.1, 414.2

[56] References Cited

U.S. PATENT DOCUMENTS

| | | | |
|---|---|---|---|
| 3,380,607 | 4/1968 | Dale | 414/482 X |
| 3,604,579 | 9/1971 | Jenkins | 414/482 |
| 3,620,397 | 11/1971 | Gagnon | 414/482 |
| 3,661,286 | 5/1972 | Smith | 414/483 |
| 4,013,184 | 3/1977 | Lacy | 414/480 |
| 4,065,825 | 1/1978 | Cohen | 414/482 X |
| 4,222,698 | 9/1980 | Boelter | 414/482 X |
| 4,415,300 | 11/1983 | Boddicker | 414/484 X |
| 4,568,235 | 2/1986 | Bills, Jr. | 414/482 X |
| 4,578,014 | 3/1986 | Coler | 414/494 X |
| 4,702,662 | 10/1987 | Marlett | 414/482 X |

FOREIGN PATENT DOCUMENTS

| | | | |
|---|---|---|---|
| 2298455 | 8/1976 | France | 414/482 |
| 8804618 | 6/1988 | World Int. Prop. O. | 414/482 |

*Primary Examiner*—Robert J. Spar
*Assistant Examiner*—John VandenBosche, Jr.
*Attorney, Agent, or Firm*—Edward R. Weber

[57] ABSTRACT

A vehicle carrier which may be used to transport compact automobiles behind motorhomes or other suitable towing vehicles and consists of two primary substructures, a main frame and a trailer bed. The automobile which is to be transported can be loaded on to or unloaded from the carrier by a single person since it is not necessary for him to be inside or in close proximity to the vehicle, nor does he have to step down from the vehicle after it is loaded on to the vehicle carrier. The carrier can be easily moved or rolled by hand and also provides means to reduce the road shock and sway which may be transferred from a vehicle carrier to a towing vehicle.

29 Claims, 2 Drawing Sheets

VEHICLE CARRIER

FIELD OF THE INVENTION

The present invention relates to vehicle trailers, and more particularly, to trailers used to transport automobiles which incorporate a tiltable bed to facilitate the loading on and unloading from the carrier. The novel device allows for safe loading and securance of the vehicle which is to be transported, provides means to facilitate the loading and unloading of the vehicle to be transported, provides suspension means to reduce the road shock transferred from the vehicle carrier to the towing vehicle, and is simply constructed to allow for easy operation.

BACKGROUND OF THE INVENTION

Trailers have been extensively used over the years to transport a variety of vehicles, such as expensive race cars, disabled vehicles, recreational vehicles, including snowmobiles, all terrain vehicles, motorcycles, and boats, specialized work vehicles, and second vehicles for numerous reasons. In general, concerns associated with the transportation of these vehicles have included the ease with which a vehicle to be transported may be loaded and unloaded, the ability to load and unload a vehicle to be transported by a minimum number of people, the elimination of damage to the transported vehicle as well as to the towing vehicle, the structural adequacy of the vehicle trailer, the positive tracking of the vehicle trailer, and the ability to back up the vehicle trailer as necessary. The prior art has addressed some of these concerns. Exemplars of this art are U.S. Pat. No. 3,035,728 (Hecker), which addresses the transportation of vehicles which cannot be towed with the tires engaging the ground due to disablement or construction features, U.S. Pat. No. 3,661,286 (Smith), which addresses the structural capacity of a vehicle trailer, U.S. Pat. No. 3,807,593 (Bourton), which provides a trailer bed which can be tilted forward and backward to facilitate the loading and unloading of recreational vehicles, and U.S. Pat. No. 4,813,841 (Eischen), which provides for easy loading and unloading of the vehicle which is to be transported without the need for additional power to tilt or slide the carrier bed.

Unfortunately, as extensive as the prior art is, shortcomings still exist and improvements can still be made, particularly with respect to trailers which transport small automobiles behind motorhomes or other suitable towing vehicles. It is therefore an object of the present invention to provide a vehicle trailer which includes means for the safe loading and unloading of a vehicle which is to be transported. It is another object of the present invention to provide means which will facilitate the loading and unloading of a vehicle which is to be transported and which will reduce the road shock transferred through the tongue of the vehicle trailer to the towing vehicle. It is a further object of the present invention to provide a vehicle trailer which is simple in construction and conforms to conventional forms of manufacture. It is a final object of the present invention to provide a vehicle trailer which is easy to operate, economically feasible, and durable. These together with other objects and features, which will be in part apparent and in part pointed out, reside in the details of construction and operation as more fully described and claimed hereinafter.

SUMMARY OF THE INVENTION

The present invention is intended to be attached to a motorhome or other suitable towing vehicle and used, in particular, to tow a compact automobile for use by the motorhome user when it is desired to make short excursions without taking the motorhome. It is simple in construction and consists of two primary substructures: a main frame and a trailer bed. The device is constructed of any of numerous known materials which are capable of withstanding the stress associated with towing a lightweight automobile.

The main frame is attached to the towing vehicle using any conventional mechanism used for attaching a trailer to a towing vehicle and supports the trailer bed on which the vehicle to be transported is positioned. The frame is essentially triangularly shaped and consists of a cross member, two bracing members, and a drawbar. The cross member in a preferred embodiment is a drop axle which permits the radius of the wheel, which is rotatably supported at each end of the cross member, to be greater than the distance by which the cross member clears the ground. Each bracing member has one end affixed to an end of the cross member. The second end of each bracing member is then pivotally attached to the drawbar. It is understood that the bracing members are on opposite sides of the drawbar and thus are attached to opposite ends of the cross member. The drawbar is essentially perpendicular to the cross member and consists of two segments. The first end of the first segment of the drawbar pivotally mates with a clevis adjacent to the cross member. The second end of the first segment of the drawbar mates with the first end of a second segment of the drawbar. A conventional trailer hitch is mounted at the second end of the second segment of the drawbar. Adjacent to the juncture of the two segments of the drawbar, a screw jack is pivotally mounted. This screw jack lends stability to the carrier when it is not attached to a towing vehicle by supporting the hitch end of the drawbar at approximately the same level as when the carrier is attached to a towing vehicle. As stated earlier, in a preferred embodiment, oversized wheels and tires are rotatably supported at either end of the cross member. Large wheels allow the device to be easily moved or rolled by hand and reduce road friction as well as bearing and tire wear when the device is in use.

The trailer bed is affixed to the main frame at each end of the cross member and consists of two runners, a plurality of cross members, and a tongue. Each runner has side walls and is closed at one end. Adjacent to the closed end of the runner is located a chock. The side walls and chock position and stabilize the vehicle which is to be transported on the trailer bed. Mounted adjacent to the closed end of each runner is a wheel harness locking means. A plurality of cross members mate with the runners and provide stability to the trailer bed and support for the vehicle which is to be transported. The tongue is essentially perpendicular to the cross members and parallel to the runners. A first segment of the tongue is located between the trailer bed cross members which are closest to the front end of the trailer bed. The second segment of the tongue extends from the trailer bed cross member which is adjacent to the closed end of the runners and is inclined upward at a slight angle. Mounted at the forward end of the second segment of the tongue is a winch. The winch may be any conventional winch and either manually or power operated.

The first segment of the tongue is pivotally mated with the clevis which is also pivotally mated with the drawbar of the main frame. Fenders extend from each runner and shelter the wheels so that the transported vehicle is protected from rocks or other materials which may be thrown from the tires.

Movement of the two primary substructures of the present invention relative to each other is accomplished and controlled by an air suspension unit and a piston. The air suspension unit consists of a control means and a bladder. The bladder is seated between and permanently attached to the tongue of the trailer bed and the drawbar of the main frame. The control means is mounted on the trailer bed at a point where it is easily accessible. The piston has a first end, which is pivotally attached to the trailer bed adjacent to the juncture of the second segment of the tongue and the cross member which is adjacent to the closed end of the runners, and a second end, which is pivotally attached to the drawbar in proximity to the screw jack.

The road shock and sway which is transferred from the vehicle carrier to the towing vehicle is attenuated by the clevis attachment between the drawbar and the tongue and is further suppressed by the air suspension unit, a cushion, and the springs of the vehicle which is to be transported. When a vehicle is to be loaded on to the vehicle carrier, the air pressure within the bladder of the air suspension unit is increased. As the bladder fills, it expands and lifts the front end of the trailer bed. The front end of the trailer bed is lifted until the open ends (rear) of the runners touch the ground. The vehicle which is to be transported is then pulled on to the runners by the winch until its tires reach the chocks where it is secured in position. The air pressure within the bladder is then reduced until the trailer bed assumes a level position. In this travel position, the juncture of the tongue, the piston, and the trailer bed cross member which is adjacent the front end of the trailer bed is juxtaposed to a cushion which is permanently attached to the drawbar. In a preferred embodiment, the cushion is a hard rubber block. The cushion coupled with the air pressure maintained in the bladder of the air suspension unit and the springs of the vehicle which is to be transported minimize the road shock and sway which is transferred from the vehicle carrier to the towing vehicle.

BRIEF DESCRIPTION OF THE DRAWINGS

In the accompanying drawings, in which one of various possible embodiments of the invention is illustrated.

DETAILED DESCRIPTION OF THE DRAWINGS

Figure 1:
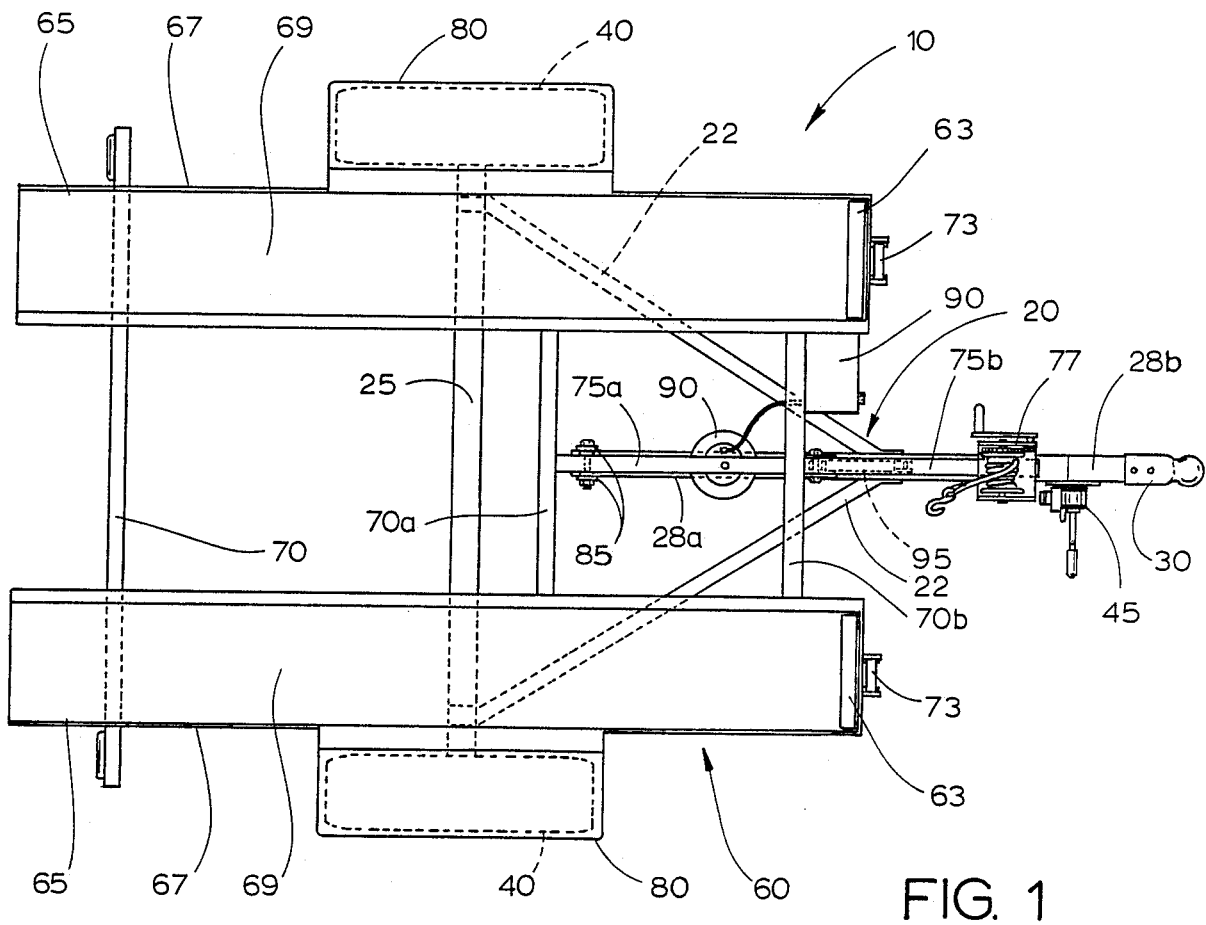
FIG. 1 is a top view of the device of the invention.
Figure 2:
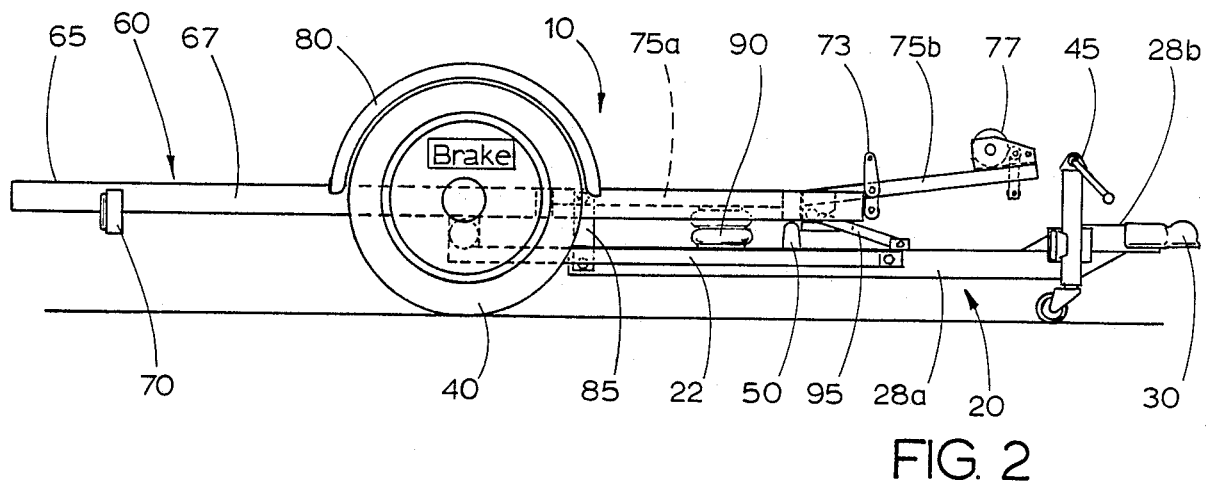
FIG. 2 is a side view of the device showing the trailer bed in relation to the main frame in a load carrying position with the screw jack engaging the ground for stability.
Figure 3:
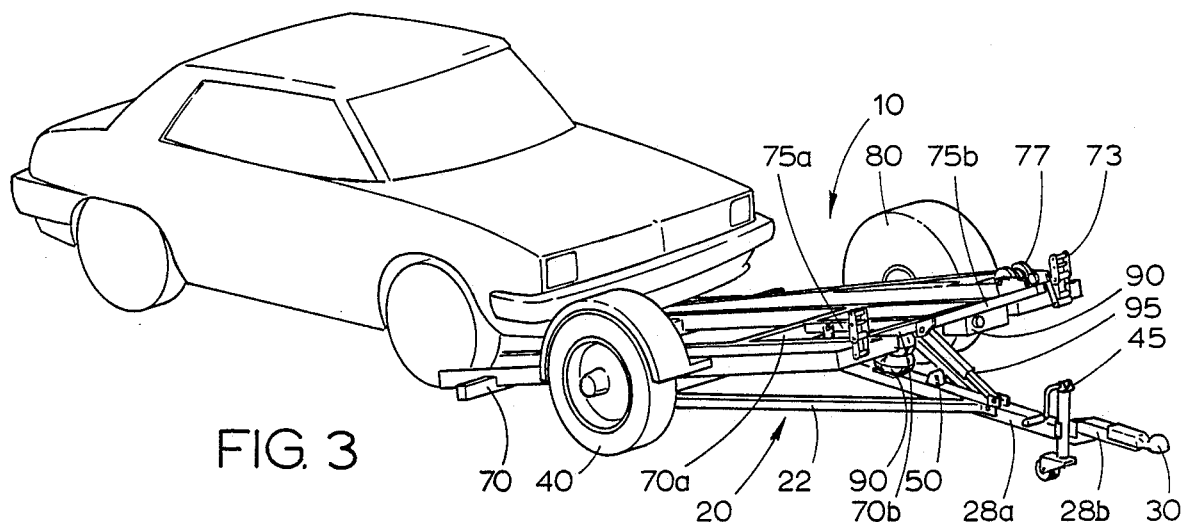
FIG. 3 is a pictorial view illustrating the trailer bed in the loading/unloading position and showing the piston means fully extended and the air suspension means supporting the trailer bed to permit movement of the vehicle on to and off of the bed.
Figure 4:
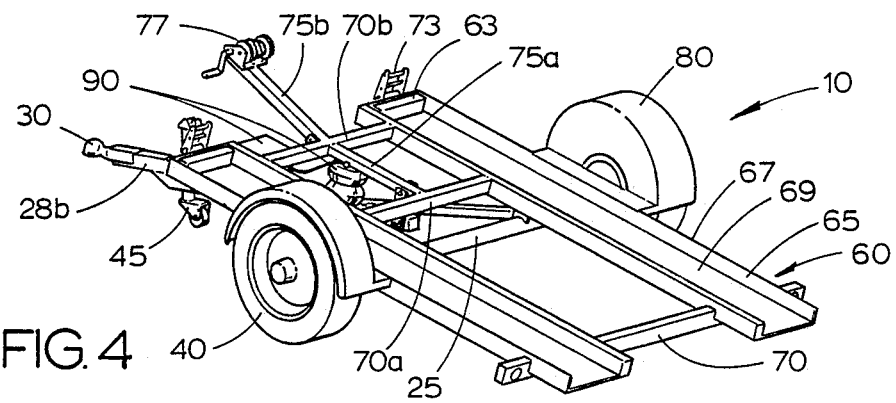
FIG. 4 is a pictorial rear view of the device further showing the bed in the loading/unloading position.
Figure 5:
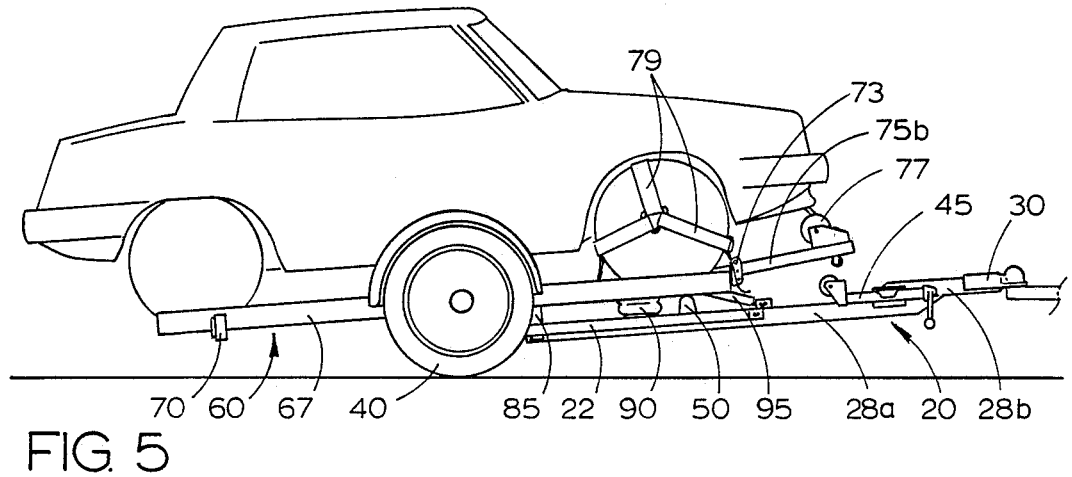
FIG. 5 is a side view of the device in the load carrying position showing the vehicle which is being transported in a secured position.

Referring now to the drawings wherein like reference characters represent like elements, FIGS. 1 through 5 illustrate one embodiment of the device of the present invention.

Vehicle carrier 10 consists of two primary substructures, a main frame 20 and a trailer bed 60. Main frame 20 is essentially triangular shaped and consists of cross member 25, bracing members 22, and drawbar 28. Cross member 25 is preferably a drop axle or other suitable device which will permit the radius of wheels 40 to be greater than the distance by which cross member 25 clears the ground. Wheels 40 are rotatably mounted at each end of cross member 25. Bracing members 22 each have a first end which is affixed adjacent to one end of cross member 25 and a second end which is pivotally attached to drawbar 28. It will be understood that bracing members 22 are on opposite sides of drawbar 28 and that consequently one bracing member 22 is affixed at each end of cross member 25. Drawbar 28 runs perpendicularly to cross member 25 and consists of two subparts 28a and 28b. Drawbar subpart 28a has a first end adjacent to cross member 25 which pivotally mates with a clevis 85 and a second end which is affixed to a first end of drawbar subpart 28b. Hitch 30 is located at the second end of drawbar subpart 28b. Screw jack 45 is pivotally mounted adjacent to hitch 30 and provides support for vehicle carrier 10 when the carrier is not attached to a towing vehicle. As will be seen, the second end of bracing members 22 is pivotally attached to drawbar subpart 28a at a point intermediate between said first and second ends of drawbar subpart 28a.

Trailer bed 60 consists of two runners 65, a plurality of cross members 70, and tongue 75. As will be seen best in FIG. 4, runners 65 have a flange 67 on either side of a bight portion 69 to form a trough. The forward end of each of runners 65 is also closed with a flange. The open ends of runners 65 allow the vehicle which is to be transported to be wheeled on to runners 65 and thus on to trailer bed 60. Seated at the closed end of runners 65 are chocks 63 which prevent forward movement of the transported vehicle while it is in the loaded position on the trailer bed. Wheel harness locking means 73 is also located adjacent to the closed ends of runners 65. Cross members 70 provide connection between runners 65 and provide stability to the trailer bed and further support for the transported vehicle. In one embodiment, means for supporting a spare tire (not shown) for the vehicle trailer can be provided between adjacent cross members. Tongue 75 is essentially perpendicular to cross members 70 and consists of two subparts 75a and 75b. Tongue subpart 75a intersects adjacent cross members 70a and 70b. Tongue subpart 75b extends forward from cross member 70b and is inclined upward at a slight angle. Winch 77 is mounted at the forward end of tongue subpart 75b. Tongue subpart 75a is pivotally attached to clevis 85, which as previously stated is also pivotally attached to drawbar subpart 28a. Fenders 80 extend from runners 65 and shelter wheels 40 thereby providing protection to the transported vehicle from rocks or other materials which may be thrown from the tires.

Interaction of trailer bed 60 relative to main frame 20 is controlled by air suspension means 90, piston means 95, and support means 50. Air suspension means 90 is seated between and connects drawbar subpart 28a and tongue subpart 75a. Piston means 95 has a first end which is pivotally attached to tongue subpart 75b adjacent cross member 70b. A second end of piston means 95 is pivotally attached to drawbar subpart 28a intermediate to where bracing members 22 mate with drawbar subpart 28a and drawbar subpart 28a joins with drawbar subpart 28b. Cushion means 50 is rigidly attached to drawbar subpart 28a and provides support for trailer bed 60 when the bed is in the load position.

To use the vehicle carrier of the instant invention, the vehicle which is to be transported is driven in close proximity behind vehicle carrier 10. The air pressure within air suspension means 90 is then increased by conventional means. This causes the air suspension means to expand and thereby increase the spacing between tongue 75 and drawbar 28 so that the forward end of trailer bed 60 is elevated relative to main frame 20. This causes the open ends of runners 65 to touch the ground. For safety, the rotation of trailer bed 60 with respect to main frame 20 is controlled by piston means 95. Once the open ends of runners 65 contact the ground, piston means 95 is clamped in position to stabilize trailer bed 60 with respect to main frame 20. Cable 93 is then extended from winch 77 and connected to the vehicle at a suitable location. The vehicle is then pulled on to runners 65 via winch 77 until its tires reach chocks 63. It should be noted that the operator of the vehicle which is to be transported does not have to be inside or in close proximity to said vehicle. With his safety ensured, he is able to watch the alignment of the vehicle relative to the trailer bed as the vehicle is being loaded on to the carrier. Neither does he have to step down from the vehicle after it is in the travel position as would be the case if it were necessary to drive the vehicle on to the carrier. When the vehicle tires reach the chocks, conventional harness straps 79 can then be placed on the tires and secured by wheel harness locking means 73. It will be noted that this can be done while trailer bed 60 is in the load position when the front wheels are in a much more accessible position. Piston means 95 may then be unclamped and the air pressure within air suspension means 90 reduced thus lowering trailer bed 60 to the travel position. It will be noted that the trailer bed and main frame are unsprung. The air pressure maintained in air suspension means 90 while the trailer bed is in the travel position together with support means 50 and the springs in the vehicle carried on the trailer bed reduce to a minimum the road shock and sway which may be transferred from vehicle trailer 10 via drawbar 28 to the towing vehicle. The vehicle which is to be transported can then be safely towed to the desired location. It will be understood that the foregoing sequence is reversed to unload the transported vehicle.

In a preferred embodiment, the present invention is constructed of materials which will allow an automobile whose weight does not exceed three thousand pounds to be successfully transported behind a motorhome or other suitable towing vehicle. Additionally, the device is outfitted with large wheels and tires to permit the vehicle trailer to be easily moved or rolled by hand and to reduce road friction and bearing and tire wear during use. The larger wheels further permit the carrier to be constructed with a single pair of wheels which in turn permits the carrier to track better and be more easily controlled during backing of the towing vehicle. Electric brakes can also be installed to reduce the distance required to stop the trailer thereby improving safety during use. As various other changes could be made in the above product without departing from the spirit and scope of the invention, it is intended that all matter contained in the above description or shown in the accompanying drawings shall be interpreted as illustrative and not in a limiting sense.

In view of the above it will be seen that the several objects of the invention are achieved and other advantageous results attained.

What is claimed is:

1. A vehicle carrier consisting of a main frame and a trailer bed; said main frame consisting of a cross member having a wheel mounted on each end, a drawbar having a means for attachment to a towing vehicle at a first end thereof and a clevis attachment means on the second end thereof, and two bracing members attaching said drawbar to said cross member, which bracing members individually have a first end pivotally attached to said drawbar at a point intermediate to said first and said second ends of said drawbar and a second end attached to said cross member at a point adjacent to a respective wheel mounted thereon; and said trailer bed consisting of a pair of runners capable of supporting the wheels of a motorized vehicle, a plurality of cross members connecting said runners and forming a rigid bed, and a tongue, which tongue projects forward in substantially the same vertical plane as said drawbar of said main frame, said tongue having a first end affixed to said trailer bed and a second end upon which a means for pulling a vehicle on to said runners is mounted, said tongue being further flexibly connected to said drawbar via said clevis; said trailer bed being attached to said cross member of said main frame at a point intermediate to the ends of said runners, said trailer bed being further supported at a point forward of the clevis attachment between said drawbar and said tongue by a means capable of flexibly maintaining a separation between said tongue and said drawbar, which means is also capable of increasing or decreasing said separation as required.

2. A vehicle carrier according to claim 1 wherein said means of flexibly maintaining a separation between said tongue and said drawbar is a pneumatic air bag.

3. A vehicle carrier according to claim 1 wherein said means for pulling a vehicle on to said runners is a winch and cable assembly.

4. A vehicle carrier according to claim 1 wherein said trailer bed is provided with means for securing the vehicle which is to be transported to the trailer bed.

5. A vehicle carrier according to claim 4 wherein said means for securing said vehicle to said trailer bed consists of a plurality of harnesses for securing the wheels of said vehicle to said trailer bed.

6. A vehicle carrier according to claim 1 wherein a support means is provided on said drawbar for supporting the forward end of said vehicle carrier when said carrier is not attached to a towing vehicle.

7. A vehicle carrier according to claim 1 wherein said wheels on said main frame are provided with brakes which are operable from the driving position of a towing vehicle to which said vehicle carrier is attached.

8. A vehicle carrier according to claim 2 wherein said means for pulling a vehicle on to said runners is a winch and cable assembly.

9. A vehicle carrier according to claim 2 wherein said trailer bed is provided with means for securing the vehicle which is to be transported to the trailer bed.

10. A vehicle carrier according to claim 9 wherein said means for securing said vehicle to said trailer bed consists of a plurality of harnesses for securing the wheels of said vehicle to said trailer bed.

11. A vehicle carrier according to claim 2 wherein a support means is provided on said drawbar for supporting the forward end of said vehicle carrier when said carrier is not attached to a towing vehicle.

12. A vehicle carrier according to claim 2 wherein said wheels on said main frame are provided with brakes which are operable from the driving position of a towing vehicle to which said vehicle carrier is attached.

13. A vehicle carrier consisting of a main frame and a trailer bed; said main frame consisting of a cross member having a wheel mounted on each end, said cross member being further provided with means whereby the radius of the wheels mounted at each end of said cross member is significantly greater than the distance of the cross member above the surface upon which the wheels are resting, a drawbar having a means for attachment to a towing vehicle at a first end thereof and a clevis attachment means on the second end thereof, and two bracing members attaching said drawbar to said cross member, which bracing members individually have a first end pivotally attached to said drawbar at a point intermediate to said first and said second ends of said drawbar and a second end attached to said cross member at a point adjacent to a respective wheel mounted thereon; and said trailer bed consisting of a pair of runners capable of supporting the wheels of a motorized vehicle, a plurality of cross members connecting said runners and forming a rigid bed, and a tongue, which tongue projects forward in substantially the same vertical plane as said drawbar of said main frame, said tongue having a first end affixed to said trailer bed and a second end upon which a means for pulling a vehicle on to said runners is mounted, said tongue being further flexibly connected to said drawbar via said clevis; said trailer bed being attached to said cross member of said main frame at a point intermediate to the ends of said runners, said trailer bed being further supported at a point forward of the clevis attachment between said drawbar and said tongue by a means capable of flexibly maintaining a separation between said tongue and said drawbar, which means is also capable of increasing or decreasing said separation as required.

14. A vehicle carrier according to claim 13 wherein said means of flexibly maintaining a separation between said tongue and said drawbar is a pneumatic air bag.

15. A vehicle carrier according to claim 13 wherein said means for pulling a vehicle on to said runners is a winch and cable assembly.

16. A vehicle carrier according to claim 13 wherein said trailer bed is provided with means for securing the vehicle which is to be transported to the trailer bed.

17. A vehicle carrier according to claim 16 wherein said means for securing said vehicle to said trailer bed consists of a plurality of harnesses for securing the wheels of said vehicle to said trailer bed.

18. A vehicle carrier according to claim 13 wherein a support means is provided on said drawbar for supporting the forward end of said vehicle carrier when said carrier is not attached to a towing vehicle.

19. A vehicle carrier according to claim 13 wherein said wheels on said main frame are provided with brakes which are operable from the driving position of a towing vehicle to which said vehicle carrier is attached.

20. A vehicle carrier according to claim 14 wherein said means for pulling a vehicle on to said runners is a winch and cable assembly.

21. A vehicle carrier according to claim 14 wherein said trailer bed is provided with means for securing the vehicle which is to be transported to the trailer bed.

22. A vehicle carrier according to claim 21 wherein said means for securing said vehicle to said trailer bed consists of a plurality of harnesses for securing the wheels of said vehicle to said trailer bed.

23. A vehicle carrier according to claim 14 wherein a support means is provided on said drawbar for supporting the forward end of said vehicle carrier when said carrier is not attached to a towing vehicle.

24. A vehicle carrier according to claim 14 wherein said wheels on said main frame are provided with brakes which are operable from the driving position of a towing vehicle to which said vehicle carrier is attached.

25. A vehicle carrier consisting of a main frame and a trailer bed; said main frame consisting of a cross member having a wheel mounted on each end, said cross member consisting of a drop axle whereby the radius of the wheels mounted on each end thereof is significantly greater than the distance of the central portion of said drop axle above the surface upon which the wheels are resting, a drawbar having a means for attachment to a towing vehicle at a first end thereof and a clevis attachment means on the second end thereof, said drawbar being further provided with a means for supporting said first end of said drawbar when said attaching means is not attached to a towing vehicle, and two bracing members attaching said drawbar to said cross member, which bracing members individually have a first end pivotally attached to said drawbar at a point intermediate to said first and said second ends of said drawbar and a second end attached to said cross member at a point adjacent to a respective wheel mounted thereon; and said trailer bed consisting of a pair of runners capable of supporting the wheels of a motorized vehicle, a plurality of cross members connecting said runners and forming a rigid bed, and a tongue, which tongue projects forward in substantially the same vertical plane as said drawbar of said main frame, said tongue having a first end affixed to said trailer bed and a second end upon which a means for pulling a vehicle on to said runners is mounted, said tongue being further flexibly connected to said drawbar via said clevis; said trailer bed being attached to said cross member of said main frame at a point intermediate to the ends of said runners, said trailer bed being further supported at a point forward of the clevis attachment between said drawbar and said tongue by a pneumatic bag capable of flexibly maintaining a separation between said tongue and said drawbar, which pneumatic bag is also capable of increasing or decreasing said separation as required.

26. A vehicle carrier according to claim 25 wherein said means for pulling a vehicle on to said runners is a winch and cable assembly.

27. A vehicle carrier according to claim 25 wherein said trailer bed is provided with means for securing the vehicle which is to be transported to the trailer bed.

28. A vehicle carrier according to claim 27 wherein said means for securing said vehicle to said trailer bed consists of a plurality of harnesses for securing the wheels of said vehicle to said trailer bed.

29. A vehicle carrier according to claim 25 wherein said wheels on said main frame are provided with brakes which are operable from the driving position of a towing vehicle to which said vehicle carrier is attached.

* * * * *